United States Patent
Castagne et al.

(10) Patent No.: US 7,290,523 B2
(45) Date of Patent: Nov. 6, 2007

(54) METHOD FOR CONTROLLING A DIRECT-INJECTION INTERNAL COMBUSTION ENGINE AND ENGINE USING SUCH A METHOD

(75) Inventors: Michel Castagne, Nanterre (FR); Hervé Perrin, Creil (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 99 days.

(21) Appl. No.: 11/217,284

(22) Filed: Sep. 2, 2005

(65) Prior Publication Data

US 2006/0048744 A1    Mar. 9, 2006

(30) Foreign Application Priority Data

Sep. 7, 2004   (FR) .................................. 04 09430

(51) Int. Cl.
*F02D 41/38*   (2006.01)
(52) U.S. Cl. ...................................... 123/305; 123/435
(58) Field of Classification Search ........ 123/435–436, 123/494, 406.41, 406.47, 305; 701/106, 701/110, 111
See application file for complete search history.

(56) References Cited

U.S. PATENT DOCUMENTS

| | | | |
|---|---|---|---|
| 5,067,460 A * | 11/1991 | Van Duyne | ................ 123/337 |
| 5,107,815 A * | 4/1992 | Van Duyne | ................ 123/435 |
| 5,323,748 A * | 6/1994 | Foster et al. | ................ 123/435 |
| 5,690,072 A * | 11/1997 | Meyer et al. | ................ 123/436 |
| 5,934,249 A | 8/1999 | Nanba et al. | |
| 6,223,120 B1 * | 4/2001 | Williams | ................ 701/111 |
| 6,574,961 B2 * | 6/2003 | Shiraishi et al. | ............. 60/602 |
| 6,876,919 B2 * | 4/2005 | James et al. | ................ 701/111 |
| 6,912,459 B2 * | 6/2005 | Tanaya et al. | ............... 701/111 |
| 2001/0013329 A1 | 8/2001 | Matsumoto et al. | |

FOREIGN PATENT DOCUMENTS

| | | |
|---|---|---|
| EP | 1 279 821 A1 | 1/2003 |
| EP | 1 384 875 A2 | 1/2004 |
| JP | 2006-77772 * | 3/2006 |

* cited by examiner

*Primary Examiner*—Hai Huynh
(74) *Attorney, Agent, or Firm*—Antonelli, Terry, Stout & Kraus, LLP.

(57) ABSTRACT

The present invention relates to a method for controlling an internal combustion engine having a means (16) for directly injecting fuel as well as a means (22) for admitting at least one fluid into the combustion chamber, a cylinder (12), a burned-gas exhaust means (28), and a processing and control unit (48) receiving information on at least the driver's torque demand and the engine speed (Ne), comprising a) determining the desired torque (Torque_des) corresponding in particular to driver demand; b) from this desired torque, determining a desired Indicated Mean Effective Pressure (IMEP_des) from which the parameters (Mair_sp, BGR_sp) are established to control admission of at least one fluid into the combustion chamber; and c) determining a specified value of the IMEP (IMEP_sp) from the desired IMEP and at least one magnitude linked to the fluid admitted into the combustion chamber, to define the fuel injection parameters (Mfuel_i, SOI_i, Pfuel) in the combustion chamber.

34 Claims, 2 Drawing Sheets

METHOD FOR CONTROLLING A DIRECT-INJECTION INTERNAL COMBUSTION ENGINE AND ENGINE USING SUCH A METHOD

BACKGROUND OF THE INVENTION

1. Field of the Invention

The present invention relates to a method for controlling combustion in an internal combustion engine, particularly a direct-injection engine, and an engine using such a method such as Diesel engines with burned-gas recirculation, and particularly engines of this type that can operate in two combustion modes.

2. Description of the Prior Art

A traditional combustion mode injects the fuel around the Combustion Top Dead Center with diffusion combustion preferably being used at high loads, while another combustion mode, known as homogenous combustion, is used at low and medium loads.

In this latter combustion mode, it is known that the fuel coming from an injector can be mixed with the gaseous fluid or fluids admitted into the combustion chamber of this engine, such as air or a mixture of air and recirculated exhaust gas, in order to obtain a homogenous air-fuel mixture before combustion begins.

This is known, particularly for Diesel engines, by the general term Homogenous Charge Compression Ignition (abbreviated HCCI) and the assignee has developed such a combustion mode using a fuel injector with a small crank angle to avoid wetting the cylinder walls with the injected fuel. This not only prevents degradation of the lubricant present on this wall, but also prevents increases in pollutant emissions and reduction in engine performance, particularly in terms of fuel consumption. Development of this combustion mode is described more precisely in French Patents 2,818,324 and 2,818,325 by the assignee offering such a process used under the name NADI™.

Moreover, at low and medium loads, this homogeneous combustion mode generates only low flame temperatures upon combustion of the air-fuel mixture in the combustion chamber, which considerably cuts down on nitrogen oxide (Nox) and particle emissions while preserving engine performance.

To favor such a combustion mode, it is desirable to introduce not only intake air but large quantities of burned gases from the exhaust and to associate this burned gas recirculation with specific fuel injection strategies. The means most commonly used to achieve such recirculation is to send some of the exhaust gases to the engine intake through an external circuit known as EGR (Exhaust Gas Recirculation).

On the other hand, as already mentioned, such engines are also designed to operate by traditional combustion, which requires more moderate burned-gas levels and different injection strategies from those used in homogeneous combustion.

The problem encountered with this type of engine operating in two combustion modes resides in the fact that it is difficult to ensure rapid, precise control of the mass of air and/or burned gases admitted into the cylinder as a function of driver demand, because the dynamics of the air loop (burned air and/or gas) are relatively slow, about a few seconds, particularly by comparison to the dynamics of the fuel loop which reacts on the order of the engine combustion cycle. Hence, in a transient operating phase, the air and/or burned-gas settings may be unsuitable for the fuel settings, which is not conducive to optimal combustion in terms of pollutant emissions, combustion noise, or fuel consumption.

SUMMARY OF THE INVENTION

The present invention provides a remedy for the above-mentioned drawbacks by a method of achieving optimal combustion while endeavoring to guarantee a torque responsive to driver demand.

For this purpose, the invention is a method for controlling an internal combustion engine having a means for directly injecting fuel into the combustion chamber, a cylinder, a means for admitting at least one fluid into said chamber, a burned-gas exhaust means, and a processing and control unit receiving information on at least the driver's torque demand and the engine speed, comprising:

a) determining a desired torque corresponding in particular to driver demand;

b) from the desired torque, determining a desired (Indicated Mean Effective Pressure (IMEP_des) from which the parameters are established to control admission of at least one fluid into the combustion chamber;

c) determining a specified value of the IMEP from the desired IMEP and at least one magnitude linked to the fluid admitted into the combustion chamber, to define a fuel injection parameters in the combustion chamber.

Preferably, the magnitude can be linked to air introduced into the combustion chamber.

The magnitude can correspond to the mass of air introduced into the combustion chamber.

Advantageously, the method may evaluate magnitude by "observers" as defined below.

This method may determine the specified IMEP value also considering the engine speed.

Advantageously, the control method may correct the injection by comparing the magnitude linked to the recirculated burned gases and/or the mass of air introduced into the combustion chamber and the reference values of the magnitude established from the specified IMEP.

The magnitude may be linked to the recirculated burned gases and be estimated by "observers" as defined below.

In the case of a spark ignition engine, the method may control the ignition parameters from the IMEP specified value.

The method may correct the ignition parameters according to the gap between the magnitude linked to the recirculated burned gases and/or the mass of air introduced into the combustion chamber and the reference values for this magnitude established from the specified IMEP.

The invention can also be applied to a direct injection internal combustion engine having at least one cylinder with a combustion chamber having a means for injecting fuel into said combustion chamber, a means for admitting at least one fluid into this combustion chamber, and a burned-gas exhaust means, combustion in said chamber being controlled by a processing and control unit, wherein the unit has a module for controlling the admission parameters of at least one fluid into the combustion chamber, a module for controlling the fuel injection parameters, and an acquisition/specification module for the control modules.

The invention can also be applied in particular to a Diesel combustion engine.

The invention can also be applied to an engine having at least one cylinder, a piston sliding in the at least one cylinder, and having a nipple pointing to the cylinder head and disposed in the center of a concave bowl, means of admission of burned exhaust and means for exhaust of burned-gas, and at least one injector to inject fuel with a crank angle less than or equal to $$2Arctg\frac{CD}{2F}$$

where CD is the cylinder diameter and F is the distance between the point of origin of the fuel jets coming from the injector and the position of the piston corresponding to a crank angle of 50° C. with respect to the top dead center.

BRIEF DESCRIPTION OF THE DRAWINGS

The other characteristics and advantages of the invention will appear from the description hereinbelow, provided solely on an illustrative and non-limiting basis, to which are attached.

DETAILED DESCRIPTION OF THE INVENTION

Figure 1:
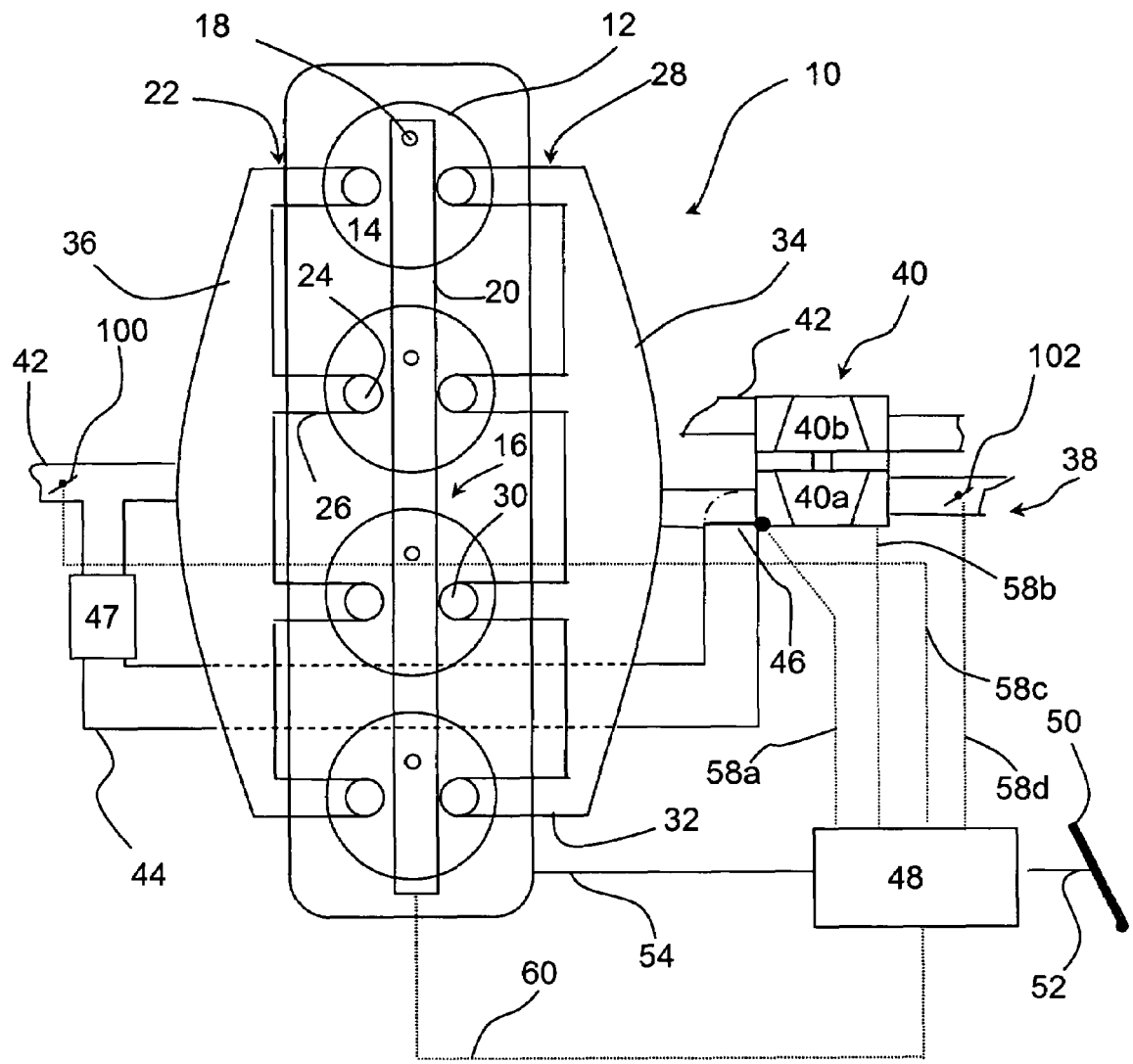
FIG. 1 showing an internal combustion engine using the combustion control method according to the invention.

FIG. 1 illustrates schematically a direct-injection internal combustion engine of the Diesel type, which can operate in two modes: a traditional combustion mode, with injection of fuel around the combustion TDC and diffusion combustion, used at high loads, and a homogeneous combustion mode with a small crank angle injector, used at low and medium loads.

This engine has at least one cylinder 12 with a combustion chamber 14 inside which combustion of an air-fuel mixture occurs. The cylinder has at least one direct fuel injection means 16, comprising a fuel injector 18 supplied by a rail 20 (a system usually known as a "common rail"). This cylinder also has at least one air intake means 22 with an intake valve 24 and inlet pipe 26 and at least one burned-gas exhaust means 28 with a valve 30 and an exhaust pipe 32. The inlet valve 24 and exhaust valve 30 are operated to open and close by any known means such as classical camshafts or camshafts that vary the lift phasing of these valves either together or independently of each other, such as those known as VVA (variable valve actuation) or VVT (variable valve timing).

As can be seen from the figure, the exhaust pipes 32 of this engine are connected to an exhaust manifold 34 while the inlet pipes 26 are connected to an inlet manifold 36. The exhaust manifold is connected to an exhaust line 38 which includes a turbocompressor 40 that admits intake air under pressure into inlet manifold 36 through a pipe 42 (only the beginning and the end of this pipe are shown in the figure for simplification). The exhaust line also has a bypass line 44 known as the EGR (exhaust gas recirculation) line, controlled by a valve 46 called the EGR valve, that recirculates some of the exhaust gases to the intake. The circuit thus formed, called the EGR circuit, can be of the high-pressure type as illustrated in FIG. 1, with the burned gases being picked up in the exhaust line upstream of turbine 40a of turbocompressor 40 and possibly a counterbalance valve 102, with the intake pressure being modulated by the valve 46, possibly a cooling device 47, and an outlet of these gases into the intake line upstream of manifold 36 and downstream of the turbocompressor 40 and possibly a cross-section restrictor such as a rotary butterfly valve 100 for modulating the intake pressure. This EGR circuit can also be of the low-pressure type with burned gas being picked up in the exhaust line 38 downstream of a particle filter (not shown) and upstream of a possible cross-section restrictor (such as a rotary butterfly valve 102), a valve dedicated to the low-pressure EGR circuit (similar to valve 46), possibly a cooling device similar to device 47 and an outlet of these gases upstream of the compressor and downstream of a valve, if any (not shown). It should be noted that the engine can receive both types of EGR circuits which can then be used simultaneously or alternatively depending on the operating point.

The engine also has a processing and control unit 48 known as the "engine computer" whose role is to control the various parameters linked to engine operation according to the information supplied thereto.

The engine computer 48 has in particular a controller known as the "combustion controller" which receives information on the torque demand created by the driver pressing on the accelerator pedal 50 through a line 52 and on the speed of this engine through a line 54. As a function of all this information, the computer 48, after processing as will be described at greater length in the specification below, sends control orders through control lines 58a, 58b, 58c, and 58d to the various actuators that act on the air loop of this engine such as the EGR valve 46, the actuator of turbocompressor 40, and/or any other actuator of the air or exhaust loop, particularly with the aid of butterfly or other valves such as the valve 100 disposed at the engine intake or the valve 102 as described above. "Air loop" is understood to be any engine element such as pipes, valves, turbocompressor, or others that admit and control a fluid such as air, supercharged air, and/or burned gases in the intake manifold and the cylinders. Control orders are also sent through control lines 60 to the fuel loop, particularly to the fuel injection means 16, so that the various fuel injection parameters can be controlled, such as injection pressure, injection time, injection phasing, etc. Likewise, the fuel loop includes any element (valve, pump, poppet valve, injection train, pump injector, etc.) for introducing fuel into the engine combustion chambers.

Figure 2:
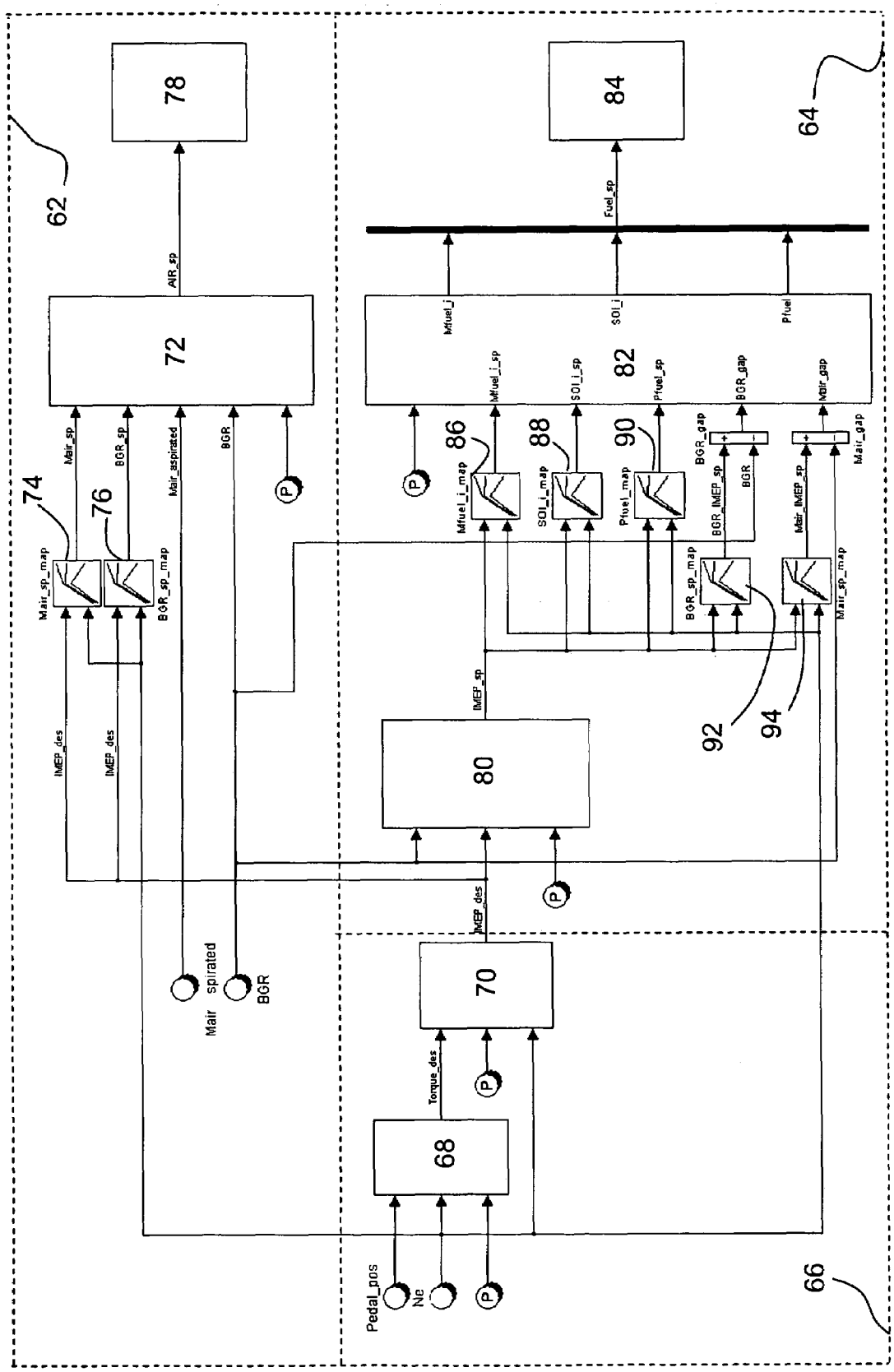
FIG. 2 is a diagram of the logic circuit used in the method according to the invention.

FIG. 2 illustrates a logic circuit representing the combustion controller built into the engine computer 48 and having two distinct control modules, a module 62 for controlling the air loop and a module 64 for controlling the fuel loop, as well as an acquisition/specification module 66 for acquiring basic control data (driver demand, engine speed, and possibly other parameters (P) such as engine temperature) and supervising the control modules.

The acquisition/specification module 66 contains a torque-determining unit 68 to establish the desired torque (Torque_des) and a unit 70 for determining the desired IMEP (Indicated Mean Effective Pressure) (IMEP_des) from the torque determined by unit 68. Information linked to the position of accelerator pedal 50 (Pedal_pos), the engine speed (Ne), and any other parameters (P) such as information linked to the brake pedal position is sent to unit 68 while information on the desired torque (Torque_des), engine speed (Ne), and any other parameters (P) such as engine temperature, engaged transmission ratio, etc. is sent to unit 70.

The air loop control module 62 has an air circuit treatment unit 72. The desired IMEP (IMEP_des) coming from unit 70 and the engine speed (Ne) are translated at the inlet to unit 72 into a specified air mass (Mair_sp) and to a specified burned gas ratio (BGR_sp) with the aid of maps 74 and 76.

This unit also receives information on the intake air mass (Mair_aspirated) and the burned gas ratio admitted by the engine cylinder (BGR) as well as any other parameters (P) such as atmospheric pressure. The magnitudes for intake air mass (Mair_aspirated) and burned gas ratio admitted to the engine (BGR) can come from direct measurements or "observers" as defined below reconstituting these data from other measurements. After processing of all this information, this unit 72 sends control instructions to the various elements 78 controlling the engine actuators and which can influence the parameters relating to air and/or recirculated burned gases admitted into the engine cylinders in order to bring these parameters as close as possible to the specified values.

The control module 64 of the fuel loop has an IMEP processing unit 80 for obtaining a specified IMEP (IMEP_sp) from the inputs on the intake air mass (Mair_aspirated), the desired IMEP (IMEP_des), and possibly other parameters (P) such as engine temperature, engine speed, and/or parameters linked to burned gas recirculation such as measured or estimated burned gas ratio (BGR). Control module 64 also includes an injection correction unit 82 defining the injection parameters (mass of fuel to be introduced into the combustion chamber for each injection (Mfuel_i), phasing of each injection (SOI_i), and injection pressure (Pfuel)) which will be sent to the elements 84 controlling the injection means 16. The inputs to unit 82 are: the fuel mass of each injection (Mfuel_i_sp), the phasing of each injection (SOI_i_sp), the injection pressure (Pfuel_sp), the burned gas ratio gap (BGR_gap), the intake air mass gap (Mair_gap), and possibly other parameters (P) such as engine speed (Ne), specified IMEP (IMEP_sp), or engine temperature. The injection parameters (Mfuel_i_sp, SOI_i_sp, and Pfuel_sp) result from maps 86, 88, and 90 that take into account the specified IMEP (IMEP_sp) and the engine speed (Ne). The burned gas ratio gap (BGR_gap) represents the difference between the burned gas ratio adapted to the specified IMEP (BGR_IMEP_sp) resulting from a map 92 (taking into account the specified IMEP (IMEP_sp) and the engine speed (Ne)) and the measured or estimated burned gas ratio (BGR). Likewise, the intake air mass gap (Mair_gap) represents the difference between the air mass adjusted to the specified IMEP (Mair_IMEP_sp) resulting from a map 94, taking into account the specified IMEP (IMEP_sp) and the engine speed (Ne) and the intake air mass (Mair_aspirated).

When the engine is in operation, unit 68 determines the desired torque (Torque_des) from various parameters such as engine speed (Ne), driver demand by accelerator pedal position (Pedal_pos), and possibly other parameters (P) such as information linked to the brake pedal position. This desired torque is then transmitted to unit 70 that determines the desired IMEP that integrates, in particular, the requirements relating to riding comfort, engine friction, and deceleration regulation—all evaluated from the engine speed (Ne), and possibly other parameters (P) such as engine temperature, engaged transmission ratio, etc., all of which combine to define the desired IMEP (IMEP_des). The information on this IMEP is sent to the input of maps 74 and 76 of the air loop control module 62 to establish the air mass specifications (Mair_sp) and the burned gas ratio specifications (BGR_sp) as a function of engine speed (Ne). These specifications as well as the information on intake air mass (Mair_aspirated) and/or burned gas ratio admitted by the engine cylinder (BGR) and possibly other parameters (P) such as atmospheric pressure are submitted to air loop processing unit 72 which will try to meet these specifications by adjusting the controls 78 of the various air loop actuators such as the intake butterfly valve 100, EGR valve 46, and the element controlling turbocompressor 40 (variable-geometry turbocompressor, for example). The air mass (Mair_aspirated) and burned gas ratio (BGR) actually admitted into the engine cylinder can be measured by any means or determined by "observers." An "observer" is any means for obtaining an evaluation of this air mass and/or this ratio from measurements coming from the engine such as the air flowrate at the inlet of intake manifold 36 or upstream of turbocompressor 40, the intake air pressure, the temperature of this air, the exhaust richness measurement, the exhaust pressure, the positions of the actuators, etc. From these evaluations, unit 72 provides loop control by evaluating their deviations from the specified values Mair_sp and BGR_sp at all times.

Despite this loop control, the air mass and burned gas ratio entering the cylinders can deviate from the specified values, particularly in the transitional operating phases between homogeneous combustion mode and traditional combustion mode or in load transients. Also, the maximum torque produced by the engine is limited by the amount of air available at the cylinder inlet and hence the richness of the air-fuel mixture cannot exceed a certain value without causing emission of pollutants such as smoke.

To guarantee optimized combustion, the control module of the fuel loop 64 takes these elements into account when determining the commands to be sent to control unit 84 of the fuel injection means 16, which has the feature of having a significantly shorter response time than that of the air loop.

The processing unit 80 of this module has a decision algorithm which, from the desired IMEP (IMEP_des) coming from unit 70, the intake air (Mair_aspirated) in cylinder 12, and possibly other parameters (P) such as engine heat, and engine speed (Ne), etc., defines the specified IMEP value (IMEP_sp) that will be used together with the engine speed (Ne) to determine the specifications for the fuel to be injected into the cylinders. These two data are in fact used as inputs for maps 86, 88, and 90 to define the various setpoints of the injection parameters such as mass of fuel introduced into the cylinders for each injection (Mfuel_i_sp), the timing of each injection (SOI_i_sp), and the injection pressure (Pfuel_sp). The index "i" used in the injection parameters corresponds to the various injections occurring in each cylinder during the combustion cycle.

Also, a burned gas ratio adjusted to the specified IMEP (BGR_IMEP_sp) is defined, which ratio is determined by a map 92 identical to map 76 of air loop control module 62, whose inputs are the specified IMEP (IMEP_sp) and the engine speed (Ne). It is then possible to evaluate the gap (BGR_gap) between the burned gas ratio adjusted to the specified IMEP and the measured or estimated ratio (BGR), then to submit this gap to unit 82 which will correct some of the injection parameters defined above that it receives at the input to send final control instructions to injection control unit 84.

Likewise, an air mass adjusted to the specified IMEP (Mair_IMEP_sp) is determined by a map 94 whose inputs are the specified IMEP (IMEP_sp) and the engine speed (Ne). The gap (Mair_gap) between the air mass adjusted to the specified IMEP and the measured or estimated intake air mass (Mair_aspirated) is evaluated then submitted to unit 82 for any corrections of some injection parameters.

The decision unit 82 can take into account other parameters (P) than the gaps (BGR_gap and Mair_gap) described above to establish corrections to be made to the injection parameters it receives at the input, such as engine speed (Ne), specified IMEP (IMEP_sp), or engine heat.

It may be noted that the use of the desired IMEP in the air loop control module 62 allows the air and/or burned gas to converge as quickly as possible on the IMEP value demanded by the driver, while the fuel loop control module 64 uses the specified IMEP value (IMEP_sp) and allows the fuel settings to be adjusted to the air and/or burned gas actually admitted into the cylinder. Thus, because of the invention, the fuel loop will be used to attempt to remedy the inertia of the air loop response.

The present invention is not confined to the embodiments described above but encompasses all variants.

Thus, the invention need not be equipped with a supercharger such as a turbocompressor, in which case the air admitted into the cylinders will be at close to atmospheric pressure. Also, the fuel direct injection means 16 can have any other form carrying out the same functions as the common rail: pump injector or equivalent system.

Note that such a control device can also be applied partially or totally to spark ignition engines provided with a direct fuel injection device into the chamber and a burned gas recirculation device. In this case, combustion is controlled jointly by the air and burned gases present in the cylinder, fuel injection, and ignition. Thus, to determine the ignition-linked parameters, one may use the same decision trees as those used for injection alone in the case of Diesel engines, such as the use of maps as a function of specified IMEP (IMEP)_sp) and engine speed (Ne) to determine the basic value of these parameters, which can then be corrected according to the gap (BGR_gap, Mair_gap) between the magnitude linked to the recirculated burned gases and/or the air mass introduced into the combustion chamber and the reference values of this magnitude (BRM_IMEP_sp, Mair-IMEP_sp) established from the specified IMEP (IMEP_sp).

The present invention is applied to Diesel engines and specifically in the case of the engine described in French patents. 2,818,324 and 2,818,325 by the assignee which are incorporated by reference into the present specification. More specifically, this type of engine includes at least one cylinder with a cylinder head, a piston sliding in this cylinder, gas intake and exhaust means, a combustion chamber defined on one side by the upper face of the piston including a nipple pointing toward the cylinder head and disposed at the center of a concave bowl, and at least one injector to inject the fuel with a crank angle less than or equal to $$2 Arctg \frac{CD}{2F}$$

where CD is the cylinder diameter and F is the distance between the point of origin of the fuel jets coming from the injector and the position of the corresponding piston at a crank angle of 50° C. with respect to the top dead center. More specifically, this crank angle is chosen between 0° and 120°.

The invention claimed is:

1. A method for controlling an internal combustion engine including direct injection of fuel into a combustion chamber, a cylinder, admission of at least one fluid into the combustion chamber, an exhaust for burned gas, and a processing and control unit receiving information on at least a driver's torque demand and engine speed, comprising:

a) determining a desired torque corresponding to the driver's torque demand;
b) determining, from the driver's desired torque, a desired Indicated Mean Effective Pressure (IMEP) from which parameters are established to control the admission of the at least one fluid into the combustion chamber; and
c) determining a specified value of the IMEP from the desired IMEP and at least one magnitude linked to the at least one fluid admitted into the combustion chamber, to define fuel injection parameters in the combustion chamber.

2. A method for controlling an internal combustion engine according to claim 1, wherein the at least one magnitude is linked to air introduced into the combustion chamber.

3. A method for controlling an internal combustion engine according to claim 2, wherein the at least one magnitude corresponds to a mass of air introduced into the combustion chamber.

4. A method for controlling an internal combustion engine according to claim 3, comprising evaluating the at least one magnitude to define the fuel injection parameters.

5. A method for controlling an internal combustion engine according to claim 4, comprising controlling fuel injection by comparing the at least one magnitude linked to at least one of recirculated burned gases, a mass of air introduced into the combustion chamber and reference values of the magnitude established from the specified value of the IMEP.

6. A method for controlling an internal combustion engine according to claim 5 wherein the engine is a spark ignition engine and ignition parameters are controlled from the specified value of the IMEP.

7. A method for controlling an internal combustion engine according to claim 4 wherein the engine is a spark ignition engine and ignition parameters are controlled from the specified value of the IMEP.

8. A method for controlling an internal combustion engine according to claim 3, comprising controlling fuel injection by comparing the at least one magnitude linked to at least one of recirculated burned gases, a mass of air introduced into the combustion chamber and reference values of the magnitude established from the specified value of the IMEP.

9. A method for controlling an internal combustion engine according to claim 8 wherein the engine is a spark ignition engine and ignition parameters are controlled from the specified value of the IMEP.

10. A method for controlling an internal combustion engine according to claim 3 wherein the engine is a spark ignition engine and ignition parameters are controlled from the specified value of the IMEP.

11. A method for controlling an internal combustion engine according to claim 2, comprising evaluating the at least one magnitude to define the fuel injection parameters.

12. A method for controlling an internal combustion engine according to claim 11, comprising controlling fuel injection by comparing the at least one magnitude linked to at least one of recirculated burned gases, a mass of air introduced into the combustion chamber and reference values of the magnitude established from the specified value of the IMEP.

13. A method for controlling an internal combustion engine according to claim 12 wherein the engine is a spark ignition engine and ignition parameters are controlled from the specified value of the IMEP.

14. A method for controlling an internal combustion engine according to claim 11 wherein the engine is a spark ignition engine and ignition parameters are controlled from the specified value of the IMEP.

15. A method for controlling an internal combustion engine according to claim 2, comprising controlling fuel injection by comparing the at least one magnitude linked to at least one of recirculated burned gases, a mass of air introduced into the combustion chamber and reference values of the magnitude established from the specified value of the IMEP.

16. A method for controlling an internal combustion engine according to claim 15 wherein the engine is a spark ignition engine and ignition parameters are controlled from the specified value of the IMEP.

17. A method for controlling an internal combustion engine according to claim 2 wherein the engine is a spark ignition engine and ignition parameters are controlled from the specified value of the IMEP.

18. A method for controlling an internal combustion engine according to claim 1, comprising evaluating the at least one magnitude to define the fuel injection parameters.

19. A method for controlling an internal combustion engine according to claim 18, comprising controlling fuel injection by comparing the at least one magnitude linked to at least one of recirculated burned gases, a mass of air introduced into the combustion chamber and reference values of the magnitude established from the specified value of the IMEP.

20. A method for controlling an internal combustion engine according to claim 19 wherein the engine is a spark ignition engine and ignition parameters are controlled from the specified value of the IMEP.

21. A method for controlling an internal combustion engine according to claim 18 wherein the engine is a spark ignition engine and ignition parameters are controlled from the specified value of the IMEP.

22. A method for controlling an internal combustion engine according to claim 1, wherein a specified value of the IMEP is determined by also considering engine speed.

23. A method for controlling an internal combustion engine according to claim 22, comprising controlling fuel injection by comparing the at least one magnitude linked to at least one of recirculated burned gases, a mass of air introduced into the combustion chamber and reference values of the magnitude established from the specified value of the IMEP.

24. A method for controlling an internal combustion engine according to claim 23, comprising estimating the at least one magnitude linked to the recirculated burned gases.

25. A method for controlling an internal combustion engine according to claim 24 wherein the engine is a spark ignition engine and ignition parameters are controlled from the specified value of the IMEP.

26. A method for controlling an internal combustion engine according to claim 23 wherein the engine is a spark ignition engine and ignition parameters are controlled from the specified value of the IMEP.

27. A method for controlling an internal combustion engine according to claim 22 wherein the engine is a spark ignition engine and ignition parameters are controlled from the specified value of the IMEP.

28. A method for controlling an internal combustion engine according to claim 1, comprising controlling fuel injection by comparing the at least one magnitude linked to at least one of recirculated burned gases, a mass of air introduced into the combustion chamber and reference values of the magnitude established from the specified value of the IMEP.

29. A method for controlling an internal combustion engine according to claim 28 wherein the engine is a spark ignition engine and ignition parameters are controlled from the specified value of the IMEP.

30. A method for controlling an internal combustion engine according to claim 1 wherein the engine is a spark ignition engine and ignition parameters are controlled from the specified value of the IMEP.

31. A method for controlling an internal combustion engine according to claim 30, comprising correcting ignition parameters according to a gap between the at least one magnitude linked to at least one of recirculated burned gases, mass of air introduced into the combustion chamber and reference values for the at least one magnitude established from the specified value of the IMEP.

32. An application of the method according to claim 1 to a Diesel combustion engine.

33. An application of the method according to claim 1 to an engine having at least one cylinder, a piston sliding in this cylinder, and a nipple pointing to the cylinder head and disposed in a center of a concave bowl, admission and burned-gas exhaust means, and at least one injector to inject fuel with a crank angle less than or equal to $$2 Arctg \frac{CD}{2F}$$

where D is the cylinder diameter and F is the distance between the point of origin of the fuel jets coming from the injector and the position of the corresponding piston at a crank angle of 50° C. with respect to top dead center.

34. A direct injection internal combustion engine comprising:
  at least one cylinder including a combustion chamber with fuel injection into the combustion chamber, admission of an exhaust at least one fluid into the combustion chamber, and a exhaust of burned gas, a processing and control unit for controlling combustion in the chamber, including a module for controlling admission of the at least one fluid into the combustion chamber based upon a driver's desired torque which is used to determine a desired Indicated Mean Effective Pressure (IMEP) to establish parameters for the admission of the at least one fluid, a module for controlling parameters of fuel injection based upon a determination of a specified value of IMPEP from the desired IMEP and at least one magnitude linked to the at least one admitted fluid, and module for determining the driver's desired torque and the desired IMEP.

* * * * *